United States Patent [19]

Levy et al.

[11] Patent Number: 4,797,762
[45] Date of Patent: Jan. 10, 1989

[54] STRESS FREE WINCHESTER DRIVE SHAFT MOUNTING

[75] Inventors: Lloyd Levy, Northridge; Dan L. Kilmer, Reseda; Kevin P. Maher, Burbank, all of Calif.

[73] Assignee: Micropolis Corporation, Chatsworth, Calif.

[21] Appl. No.: 99,536

[22] Filed: Sep. 22, 1987

[51] Int. Cl.[4] .................... G11B 5/105; G11B 17/02; G11B 21/02
[52] U.S. Cl. ................. 360/99.06; 360/106; 360/98.07
[58] Field of Search ............... 360/97, 98, 99, 106

[56] References Cited

U.S. PATENT DOCUMENTS

| | | | |
|---|---|---|---|
| 4,285,016 | 8/1981 | Gilovich | 360/98 |
| 4,519,010 | 5/1985 | Elsaesser et al. | 360/98 |
| 4,672,487 | 6/1987 | Brand et al. | 360/98 |

*Primary Examiner*—Robert S. Tupper
*Attorney, Agent, or Firm*—Poms, Smith, Lande & Rose

[57] ABSTRACT

A Winchester disk drive assembly includes upper and lower mounting plates and shafts for the main drive motor assembly and for the head positioner firmly connected to both mounting plates. One end of the shafts is mounted to one of the mounting plates by a shouldered washer. A shouldered washer is mounted in a counterbored hole in the adjacent mounting plate and is firmly secured to the adjacent shaft end by a steel screw, with the dimensions of the washer being selected to provide space between the enlarged head portion of the washer, and the counterbore, so that the shaft is entirely stress-free. The space between the inner surface of the enlarged portion of the T-shaped washer and the counterbored recess is then filled with epoxy which bonds the two parts together. The shouldered washer then becomes an essential part of the adjacent mounting plate, and the mounting plate may be removed and separated from the shaft by removing the steel screw. The shouldered washer and the mounting plate may be formed of aluminum or an alloy thereof, and the epoxy may be filled with finely-divided aluminum particles, so that thermal cycling has no adverse effects.

20 Claims, 2 Drawing Sheets 4,797,762

STRESS FREE WINCHESTER DRIVE SHAFT MOUNTING

FIELD OF THE INVENTION

This invention relates to mounting arrangements for the shafts for the main motor and the head positioner drive for Winchester disk drives.

BACKGROUND OF THE INVENTION

In the field of storage systems using hard magnetic disks, also known as Winchester drives, the density storage of data on the disks has reached a relatively high level. Thus, for example, in 5¼ inch disk diameter drive, each disk may have somewhat more than 1,000 tracks, and each track contains more than 20,000 bytes of information, with each byte including eight binary digits or bits of information. Thus, each side of a 5¼ inch hard disk is capable of carrying in the order of 1,000,000 bits of information, and the density of storage of information will no doubt increase, as it has in the past.

With this very high density of data storage, even slight stresses or misalignment, accentuated by vibration and/or thermal cycling, may introduce significant errors into the recording or reading of information. It is therefore most important that the mechanical arrangements for mounting the motor and the disks, as well as the magnetic head positioner, be free of undesired mechanical stresses. In addition, it is important that the mechanical arrangements be such that undue vibration or oscillations do not occur.

Two basic areas in a Winchester disk drive where stresses might otherwise be introduced, are the shafts for mounting the main drive motor and for mounting the head positioner. These two shafts are normally mounted both to a base plate and to the mounting plate forming a portion of the housing at the other end of the shaft. In some Winchester disk drive designs, these shafts have initially been secured to the base plate, and then, following enclosing the drive in the housing, the other ends of the shafts have been rigidly secured to a previously machined location on the mounting plate, forming part of the housing at the other end of the shaft. However, because of the normal slight misalignment between the two portions of the housing, relative to the two ends of the shafts, significant stresses may be established in the shafts, which eventually may be expected to produce data errors in recording and/or reading, in the course of the life of the unit, and the vibration and thermal cycling to which the units are subjected.

It is understood that it has previously been proposed to place a simple washer between the end of the shaft, and the upper mounting plate, with the washer being secured to the mounting plate by epoxy, and with a screw extending through the mounting plate and the washer into the end of the shaft. However, while this arrangement compensated for certain types of variations in shaft length or the like, the configuration did not preclude stresses and strains of other types.

Accordingly, a principal object of the present invention is to provide arrangements for mounting the end of a shaft in a Wichester drive so that it is entirely stress-free.

SUMMARY OF THE INVENTION

In accordance with the present invention, the foregoing object is achieved by the use of a shouldered washer having a flattened T-shaped configuration, and a counterbored mounting plate. The shouldered washer is firmly secured into the end of the shaft, with a central screw, and the enlarged head of the T-shaped washer, is secured by adhesive such as epoxy, into the counterbored recess in the mounting plate. The hole through the mounting plate is slightly larger than the reduced portion of the shouldered washer, so that slight misalignment of the shaft relative to the adjacent mounting plate is permitted. By this arrangement, a fully stress-free assembly of the end of the shaft to the mounting plate is achieved.

It may be noted in passing that the shaft may be either steel or aluminum, with steel being employed in the case of the main drive motor shaft, and an aluminum shaft being employed in the case of the head positioner shaft. The shouldered washer is preferably of the same material as the housing, normally aluminum. The adhesive may be epoxy, and preferably has thermal expansion properties which are not too dissimilar to that of the shouldered washer and the mounting plate. Using epoxy filled with aluminum particles provides an adhesive which is close to aluminum in its thermal expansion properties. The central screw firmly securing the shouldered washer to the end of the shaft, is preferably of steel.

The other end of the main motor drive shaft may be secured to an insert plate in one of the mounting plates forming the base plate of the unit. The main motor drive shaft may have an enlarged shoulder adjacent the mounting plate, and a reduced diameter portion adhesively secured to a bore extending through the insert plate. The drive housing includes the main base plate forming one mounting plate for the shafts, and the other, upper mounting plate having depending sides which engage the base plate. The use of the shouldered washer and epoxy mounting arrangements for the upper end of the main drive shaft, permits a stress-free mounting thereof, without the need to hold very tight tolerances, (1) on the mounting of the insert base plate to the main base plate, and (2) on the securing of the two main parts of the housing together.

Other objects, features and advantages of the invention will become apparent from a consideration of the following detailed description and from the accompanying drawings.

BRIEF DESCRIPTION OF THE DRAWINGS

FIG. 3 is an enlarged showing of the portion of the disk drive of FIG. 2.

DETAILED DESCRIPTION

The drawings employed in the present patent application are very similar in many respects to those employed in two prior U.S. patent applications, Ser. Nos. 911,637, filed Sept. 25, 1986 and 003,063, filed Jan. 14, 1987. Accordingly, the figures of the present drawings will only be described in a cursory manner relative to the overall features of the disk drive, and then emphasis will be placed on the specific constructional features to which the present application primarily relates.

Figure 1:
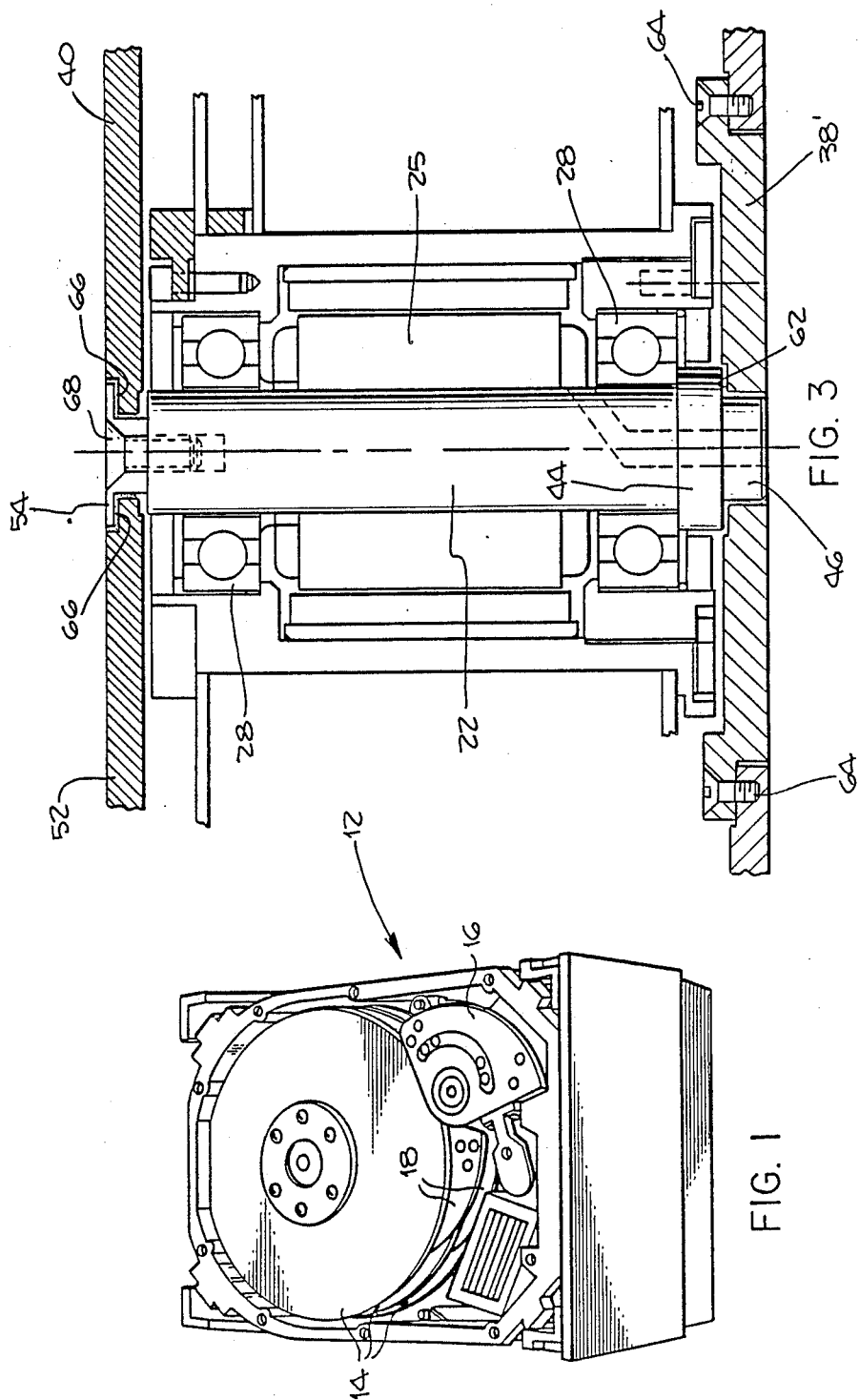
FIG. 1 is a perspective view of a prior art Winchester disk drive.

Referring more particularly to the drawings, FIG. 1 shows a prior art Winchester or hard disk drive storage unit of the type which has been sold by the assignee of the present invention, and which is currently available for sale from Micropolis Corporation, 21329 Nordhoff, Chatsworth, Calif. 91311. This is a 5¼ inch hard disk drive, and includes a series of storage disks 14, which are rotatable at relatively high speeds. A head positioner 16 has associated with it arms 18 on which magnetic heads are supported for engagement with tracks on the disks 14. With the disks 14 being rotated at high speeds, the magnetic heads have an air cushion between the surface of the disk and the heads, and write and read digital information onto and from the disks 14, with their magnetizable surfaces.

Figure 2:
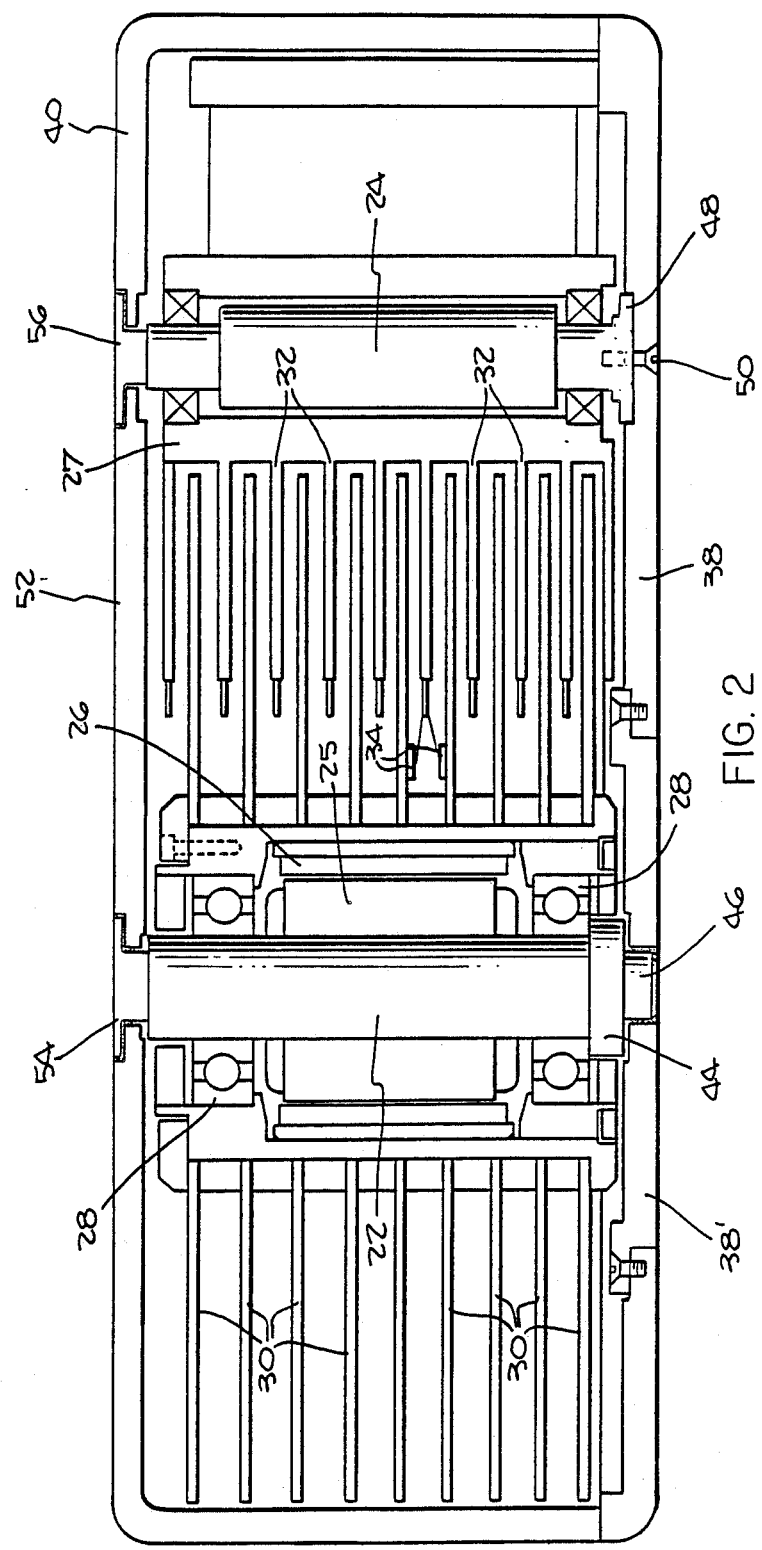
FIG. 2 is a cross-sectional view of a disk drive illustrating the principles of the present invention.

FIG. 2 is a more detailed showing of a hard disk drive, illustrating the present invention, with the fixed shaft 22 being mounted at the center of the main motor and disk assembly, and the fixed shaft 24 being mounted to pivotally support the head positioning assembly 26. Mounted on the fixed steel shaft 22 is the stator coil assembly 25, and the permanent magnet rotor 26 is mounted on bearings 28 to rotate with the hard disks 30 about the shaft 22. The head positioner 27 carries a series of arms 32 which in turn carry spring-mounted heads, two of which are shown at 34 between, and in proximity to, two of the hard disks 30.

The housing includes a base plate 38, including insert base plate 38', to which the shafts 22 and 24 are rigidly secured, and an enclosing cover 40 including the upper portion which constitutes a mounting plate 52 into which the shafts 22 and 24 are secured. The shaft 22 has an enlarged shoulder 44, and a reduced diameter end member 46 which is rigidly bonded to the base plate 38 by an anaerobic adhesive, as a subassembly. Similarly, the shaft 24 has an enlarged lower end 48 which is bonded to the base plate 38, and held rigidly against the base plate 38 by the screw fastener 50.

The upper ends of the shafts 22 and 24 are secured in a stress-free manner to the upper mounting plate 52 forming part of the housing 40, by the shouldered washers 54 and 56, respectively. The two joints are substantially the same, so the joint for the shaft 22 will be described in greater detail hereinbelow, in combination with FIG. 3 of the drawings. The steel shaft 22 has an enlarged end portion 44, and a reduced extending portion 46 which makes a press fit with the opening in the base plate 38. In addition, the base plate 38 has a counterbore 62 around the opening through which the end 46 of shaft 22 extends. Anaerobic cement is employed in the counterbore 62 and on the mating surfaces of the extension 46 and the hole into which it is press fit, as mentioned above, so that the lower surface of the shaft 22 is flush with the outer surface of the base plate 38'. The complete base plate 38 includes the central section 38' to which the shaft 22 is secured as a subassembly. This subassembly, including the small insert plate 38', is subsequently assembled to the remainder of the base plate 38 by screws 64.

Now, as mentioned above, it is desirable that the upper end of the shaft 22 be secured to the mounting plate 52 forming part of the housing 40. However, it is also important that the mounting be entirely stress-free to avoid possible shift in the mechanical configuration following vibration or thermal cycling. To accomplish this desired function, the shouldered washer 54 is employed, in combination with the adhesive 66, which may be epoxy, located along the mating surfaces of the shouldered washer 54, and the counterbored opening in the plate 52. The central steel screw 68 holds the shouldered washer 54 in firm engagement with the upper end of the steel shaft 22. The epoxy 66 is then permitted to set up. Incidentally, the epoxy is confined to the area between the washer 54 and the counterbored opening in the upper mounting plate 52. Subsequently, if it is desired to disassemble the unit, the screw 68 may be removed, and the housing plate 40 lifted off the lower base plate 38, with the shouldered washer 54 having become essentially part of the upper mounting plate 52.

To give an indication of the dimensions which are involved, although these are not critical, the steel shaft 22 may be 12 millimeters or 0.472 inches in diameter, and the outer diameter of the upper portion of the shouldered washer 54 may be ¾ or ⅝ of an inch, with the reduced diameter portion being approximately 0.33 inch. The axial length of the reduced diameter portion is chosen to fit the assembly, so that the upper surface of the shouldered washer 54 is flush with, or slightly recessed into, the upper surface of the mounting plate 52, and this axial distance normally ranges from approximately 0.045 inch to approximately 0.070 inch, with several washers with differences in this dimension being available for use in assembly. The thickness of the upper larger diameter portion of the shouldered washer 54 may be approximately 0.030 inch. The bore, counterbore, and shouldered washer dimensions for mounting both shafts 22 and 24 to the upper mounting plate 52 are identical, so that both the machining operation for the counterbored holes in the mounting plate 52 and the size of the shouldered washers 54 are the same, for both of the shafts. Incidentally, one epoxy which may be employed as the adhesive 66 is sold under the trademark "Scothbond 3501".

In conclusion, it is to be understood that the foregoing detailed description and the accompanying drawings are illustrative of a preferred embodiment of the invention. Various minor changes and modifications may be made without departing from the spirit and scope of the invention. Thus, it has been mentioned that the shaft 22 is formed of steel and the shaft 24 is formed of aluminum. In addition, with the housing 40 being formed of aluminum, the shouldered washers 54 and 56 are preferably also of aluminum to avoid thermal discontinuities as the unit is heated and cooled. In the event other materials are employed for the housing 40 with its mounting plate 52, the material for the shouldered washers 54 and 56 should be selected for thermal expansion compatibility. In addition, the adhesive 66, as shown in FIG. 3, should preferably have a coefficient of thermal expansion which is not unduly dissimlar to that of the shouldered washer and the mounting plate. The use of finely powdered aluminum as a filler for the epoxy may be employed to provide matching thermal expansion properties. Accordingly, the present invention is not limited to the arrangements as shown in the drawings, and described in the foregoing detailed description.

What is claimed is:

1. A Winchester disk drive assembly having stress free shaft mounting arrangements comprising:
 a housing for the disk drive including first and second spaced mounting plates;
 a disk drive mounted within said housing, said disk drive including shafts for both a main drive motor assembly and for a head positioner;
 a first end of at least one of said shafts being rigidly secured to said first mounting plate;

means including a shouldered washer for securing the second end of said shaft to said second mounting plate;

said second mounting plate having a hole and an associated counterbored recess for receiving said shouldered washer;

said washer having a reduced diameter portion for engagement with said second end of said shaft, at a point spaced inward from said second mounting plate, and having an enlarged portion located in said counterbore;

screw means for holding said shouldered washer in firm engagement with said second end of said shaft, and with the enlarged portion of said shouldered washer spaced from said counterbored recess; and adhesive means for filling the space between the enlarged portion of said shouldered washer and said counterbored recess and for firmly securing said shouldered washer to said second mounting plate following securing of said washer to the end of said shaft;

whereby a stress-free mounting of said shaft is obtained, with access being provided to the housing by removing said screw means, and disassembling said second plate with said washer.

2. A Winchester disk drive assembly as defined in claim 1 wherein said adhesive is epoxy.

3. A Winchester disk drive assembly as defined in claim 1 wherein said first and second mounting plates are formed of aluminum or an alloy thereof, and wherein said adhesive is filled with aluminum particles.

4. A Winchester disk drive assembly as defined in claim 1 wherein said mounting plates are formed of aluminum and said shouldered washer is also formed of aluminum.

5. A Winchester disk drive assembly as defined in claim 1 wherein said shaft is formed of steel.

6. A Winchester disk drive assembly as defined in claim 4 wherein said shaft is formed of aluminum.

7. A Winchester disk drive assembly as defined in claim 4 wherein said screw means is made of steel.

8. A Winchester disk drive assembly as defined in claim 1 wherein both of said shafts are secured to said two mounting plates in the manner set forth in claim 1.

9. A Winchester disk drive assembly as defined in claim 1 wherein said housing includes a composite base plate forming said first mounting plate, with the composite base plate including an insert base plate into which the main motor drive shaft is secured as a subassembly, said insert base plate being mechanically secured to the remainder of said base plate, and said housing further including a cover plate having a relatively flat portion forming said second mounting plate, and depending sides for engaging said composite base plate forming said first mounting plate.

10. A Winchester disk drive assembly as defined in claim 1 wherein said first end of said one shaft has a reduced diameter and is adhesively secured into a bore in said first mounting plate.

11. A Winchester disk drive assembly as defined in claim 1 wherein said one shaft has a predetermined diameter for the greater part of its length, and an enlarged flange adjacent said first end thereof adjacent said first mounting plate.

12. A Winchester disk drive assembly having stress free shaft mounting arrangements comprising:

a housing for the disk drive including first and second spaced mounting plates;

a disk drive mounted within said housing, said disk drive including shafts for both a main drive motor assembly and for a head positioner;

a first end of at least one of said shafts being rigidly secured to said first mounting plate;

means including a shouldered washer for securing the second end of said shaft to said second mounting plate;

said second mounting plate having a hole and an associated counterbored recess for receiving said shouldered washer;

said washer having a reduced diameter portion for engagement with said second end of said shaft, at a point spaced inward from said second mounting plate, and having an enlarged portion located in said counterbore;

screw means for holding said shouldered washer in firm engagement with said second end of said shaft; and adhesive means between the enlarged portion of said shouldered washer and said counterbored recess for securing said shouldered washer to said second mounting plate following securing of said washer to the end of said shaft;

said housing including a composite base plate forming said first mounting plate, with the composite base plate including an insert base plate into which the main motor drive shaft is secured as a subassembly, said insert base plate being mechanically secured to the remainder of said base plate, and said housing further including a cover plate having a relatively flat portion forming said second mounting plate, and depending sides for engaging said composite base plate forming said first mounting plate;

whereby a stress-free mounting of said shaft is obtained, with access being provided to the housing by removing said screw means, and disassembling said second mounting plate with said washer.

13. A Winchester disk drive assembly as defined in claim 12 wherein said adhesive is epoxy.

14. A Winchester disk drive assembly as defined in claim 12 wherein said first and second mounting plates are formed of aluminum or an alloy thereof, and wherein said adhesive is filled with aluminum particles.

15. A Winchester disk drive assembly as defined in claim 12 wherein said mounting plates are formed of aluminum and said shouldered washer is also formed of aluminum.

16. A Winchester disk drive assembly as defined in claim 12 wherein both of said shafts are secured to said second mounting plates in the manner set forth in claim 12.

17. A Winchester disk drive assembly having stress free shaft mounting arrangements comprising:

a housing for the disk drive including first and second spaced mounting plates;

a disk drive mounted within said housing, said disk drive including a main drive motor shaft;

a first end of said shaft being rigidly secured to said first mounting plate;

means including a shouldered washer for securing the second end of said shaft to said second mounting plate;

said second mounting plate having a hole for receiving said shouldered washer;

said washer having a reduced diameter portion for engagement with said second end of said shaft, at a point spaced inward from said second mounting plate, and having an enlarged portion having a diameter greater than said hole for overlying a surface of said second mounting plate;

means for holding said shouldered washer in firm engagement with said second end of said shaft; and adhesive means between the enlarged portion of said shouldered washer and said surface of said second mounting plate for securing said shouldered washer to said second mounting plate following securing of said washer to the end of said shaft;

whereby a stress-free mounting of said shaft is obtained, with access being provided to the housing by removing said screw means, and disassembling said second mounting plate with said washer.

18. A Winchester disk drive assembly as defined in claim 17 wherein said housing includes a composite base plate forming said first mounting plate, with the composite base plate including an insert base plate into which the main motor drive shaft is secured as a subassembly, said insert base plate being mechanically secured to the remainder of said base plate, and said housing further including a cover plate having a relatively flat portion forming said second mounting plate, and depending sides for engaging said composite base plate forming said first mounting plate.

19. A Winchester disk drive assembly as defined in claim 17 wherein said first end of said shaft has a reduced diameter and is adhesively secured into a bore in said first mounting plate.

20. A Winchester disk drive assembly as defined in claim 17 wherein said shaft has a predetermined diameter for the greater part of its length, and an enlarged flange adjacent said first end thereof adjacent said first mounting plate.

* * * * *